June 14, 1927.   1,632,528
H. ZEIDLER
CIRCULAR FORMING TOOL
Filed Dec. 21, 1925
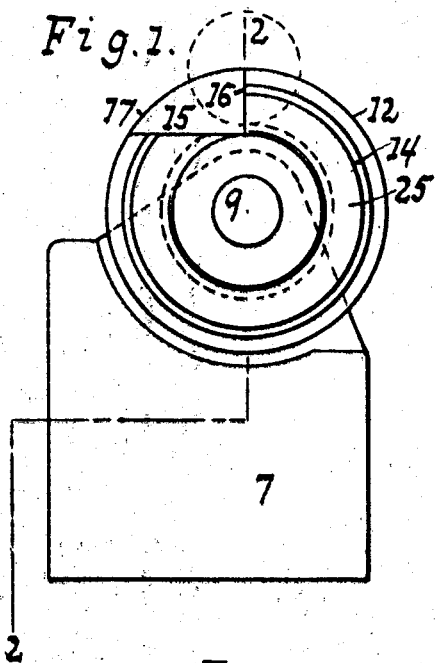
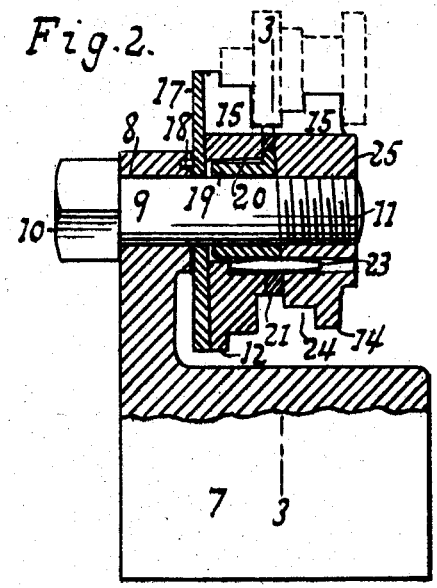
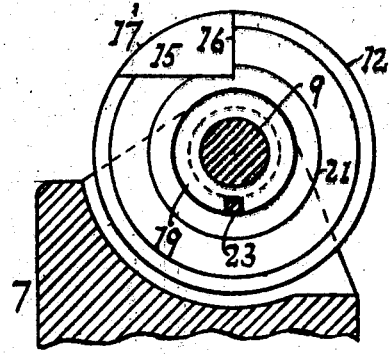
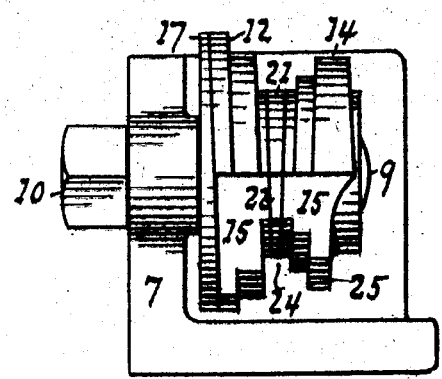
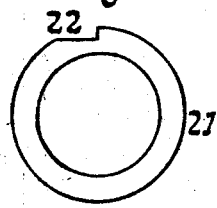
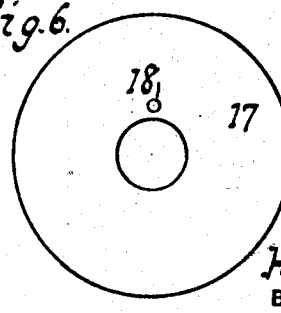
INVENTOR
*Hugo Zeidler*
BY
ATTORNEYS Patented June 14, 1927.

1,632,528

UNITED STATES PATENT OFFICE.

HUGO ZEIDLER, OF BROOKLYN, NEW YORK.

CIRCULAR FORMING TOOL.

Application filed December 21, 1925. Serial No. 76,925.

This invention relates essentially to a circular tool for cutting and forming cylindrical metal articles and it is designed to include an annular space arranged in the periphery of the tool to provide clearance for the rapidly revolving cut portions of the work.

An object of the invention is to provide a circular tool in which almost the whole circumference is utilized to regrind the cutting edge.

Another object of the invention is to provide a tapered channel to form an annular clearance space in the periphery of the tool and a helical side portion so that the cutting edges will contact with the work at an angle and thus make a close clean cut into the metal.

Another object of the invention is to provide means for adjusting the sides of the channel after grinding the cutting edges so that the width at the cutting and clearance channel edge will remain the same as it was before grinding.

Another object of the invention is to provide two aligned cutting units and means for adjusting the units axially in order that the diverging side wall of each unit will coincide with or have the same angle as the wall of the other unit constituting the clearance channel for the work.

The invention resides more particularly in the novel combinations hereinafter described and claimed, reference being made to the accompanying drawing in which:—

Fig. 1 represents a side elevation of a tool embodying this invention.

Fig. 2 is a vertical longitudinal section taken along the line 2—2 of the same.

Fig. 3 is a transverse section taken along the line 3—3 of Fig. 2.

Fig. 4 is a plan view of Fig. 2.

Fig. 5 is a side view of an intermediate washer.

Fig. 6 is a similar view of an end washer.

In the drawing the numeral 7 designates a frame having a hole 8 for the insertion of a bolt or shaft 9 provided with a head 10 at one end and a screw threaded portion 11 at its other end. The frame when in use is attached to the sliding or movable part of a metal cutting machine or lathe in which the mandrel carries the work to be formed. The work is formed by moving the frame carrying the cutting tool toward the revolving mandrel as is well known.

The tool consists of two cutter heads 12 and 14 mounted on the shaft. Both cutter heads are fixed to the shaft and each head has a notch 15 provided with cutting edge 16 for cutting into the metal. On the shaft at the rear of the cutter head 12 is mounted a washer or disk 17 having a pin 18 for engagement with a hole in the frame so as to fix the washer to the shaft. The face of the washer is tapered so that the cutter head can be fixed to the shaft at an angle. The cutter head is mounted on a sleeve or bushing 19 and it has a tapered bore 20 so that it can be fixed at an angle to the shaft and permit the rear surface to align with the tapered part of the washer.

On the sleeve is mounted an intermediate washer 21 which is also tapered in order to fix the cutter head 14 at an angle to its axis. The washer is provided with a notch 22 formed in its periphery as shown in Fig. 5. The two cutter heads are coupled together by means of a key 23 engaging angular orifices in the heads. Each cutter head is equipped with step portions of varying configuration in order to form an annular tapered channel 24 for gauging and guiding the work. The outer side 25 of the cutter head 14 is helical so as to cut into the metal at an angle and to furnish ample clearance space for the cut portions of the work.

When the head 14 is screwed onto the shaft it jams against the intermediate washer and the key connection prevents the rear cutter head from turning on the shaft. When it is desired to regrind the cutter heads the screw shaft is loosened until the outer cutter head is free of the key and can be removed from the shaft. The rear cutter can then be removed by sliding it with the sleeve and intermediate washer off the shaft.

The two cutter heads after being reground can be readily assembled or relined on the shaft simply by slipping the sleeve, rear cutter and intermediate washer onto the shaft with the key projecting from the inner head. The outer head is then placed with the angular orifice in register with the key and the said screw is turned to engage the threaded bore and actuated until the inner face of the head strikes against the washer. The notch in the intermediate washer is not reground but when it becomes worn or dull it can be replaced by another washer with a similar taper. The washer thus controls the space between the walls and substantially the narrowest part of the channel is located adjacent the notched part of the cutter head.

As indicated in Fig. 4 the channel tapers from the cutting edge and the cut portions of the work as they revolve in the channel are not impeded. In the above tool the space between the divergent walls of the channel at its cutting edge remains the same no matter how far the cutting edges have been ground about the perimeter of the head. The width of the channel and the stepped portions can be varied for different kinds of work by inserting other washers of different configuration but in each case the method of cutting the metal noted above is followed.

By having the bore of the cutter head 12 tapered, it permits the head to be set at an angle on a substantially rectilinear shaft, and the tapered fixed washer 17 behind the head controls the inclined plane. The tapered key 23 permits angular adjustment of the two cutter heads relative to one another. The notch 22 of the tapered intermediate washer forms a guide or gauge to bring the notches of the cutter heads into register with each other. In this tool the notch cuts two shoulders in the work while the inclined and helical sides being divergent at the notch respectively give clearance space between the two shoulders.

I claim:—

1. A forming tool comprising a shaft, a pair of circular heads secured to the shaft each having a notch provided with a cutting edge forming an inclined plane, and a tapered notched washer arranged between the heads made to register with the notches in the heads.

2. A forming tool comprising a frame, a threaded shaft mounted on the frame, a tapered washer fixed to the frame, a pair of circular heads arranged on the shaft each having a notch provided with a cutting edge, one of the heads having a tapered bore to set it at an angle on the shaft against the washer, a tapered notched washer positioned between the heads, the other head having a threaded bore to engage the shaft and jam the head against the washer, and means for coupling the heads together.

3. A forming tool comprising a frame, a threaded shaft mounted on the frame, a tapered washer fixed to the frame, a pair of circular heads arranged on the shaft each having a notch provided with a cutting edge, one of the heads having a tapered bore to set it at an angle on the shaft against the washer, a tapered notched washer positioned between the heads, the other head having a threaded bore to engage the shaft and jam the head at an angle against the washer, and a tapered key coacting with orifices in the heads for coupling the heads together.

In testimony whereof I have hereunto set my hand.

HUGO ZEIDLER.